H. A. LARSON.
COUPLING EXPANDER.
APPLICATION FILED NOV. 9, 1920.

1,418,721. Patented June 6, 1922.

Inventor.
Hiram A. Larson

UNITED STATES PATENT OFFICE.

HIRAM A. LARSON, OF MANITOWOC, WISCONSIN, ASSIGNOR OF ONE-THIRD TO ARTHUR J. RAHN AND ONE-THIRD TO NELS P. PETERSEN, BOTH OF MANITOWOC, WISCONSIN.

COUPLING EXPANDER.

1,418,721.  Specification of Letters Patent.  Patented June 6, 1922.

Application filed November 9, 1920. Serial No. 422,863.

*To all whom it may concern:*

Be it known that I, HIRAM A. LARSON, a citizen of the United States, and resident of Manitowoc, in the county of Manitowoc and State of Wisconsin, have invented certain new and useful Improvements in Coupling Expanders; and I do hereby declare that the following is a full, clear, and exact description thereof.

My invention relates to coupling expanders, and is adapted to be used primarily in connection with hose couplings. It is apparent, however, that it can also be used in connection with other couplings, and, in fact, may be used wherever it is desired to expand an annular or cylindrical member.

In the hasty handling to which fire hose is necessarily subjected, the coupling members naturally become bruised and bent, and often great difficulty is experienced in uniting the threaded ends thus resulting in much delay.

The principal object of the present invention, is to provide a tool which may be inserted in the end of the female member of the coupling and expanded outwardly, thereby restoring the coupling to its original shape.

A more specific object of the invention is to provide a tool which may be quickly applied and easily manipulated, and one which may be economically manufactured.

Figure 1:
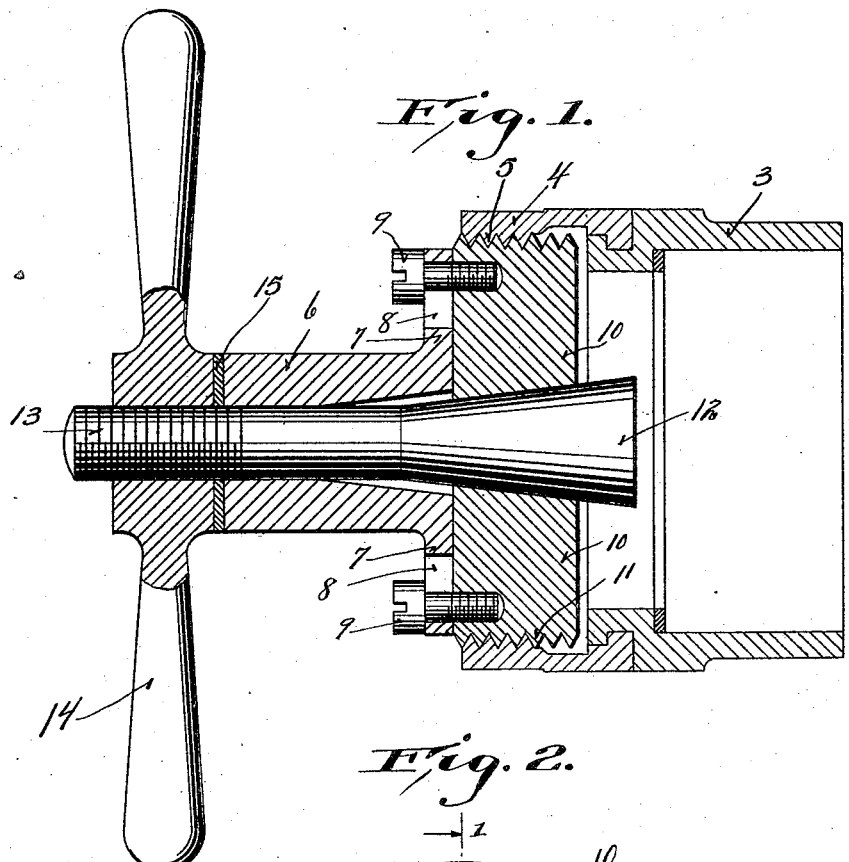
Figure 2:
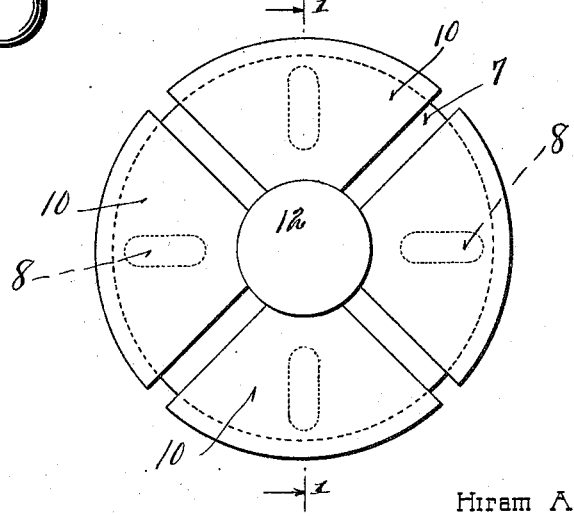

In describing my invention, reference may be had to the accompanying drawing, in which:

Figure 1 is a longitudinal sectional view of the device as applied to a coupling, the same being taken on the plane of the line 1—1 of Figure 2, and Figure 2 is an end elevational view from the right in Figure 1.

Like reference characters refer to like parts in each of the views.

The numeral 3 designates the end of a hose provided with the female coupling member 4, which is internally threaded as at 5. The invention comprises a hollow member 6 provided at its end with an annular flange 7 through which are formed the slots 8. Screws 9 are inserted through the slots and screwed into the segmental dies 10, which are formed with peripheral threads 11, which are adapted to fit into the threads 5.

Through the hollow member 6 is inserted a member one end of which is tapered as at 12, and the other end of which projects through the hollow member 6 and is threaded as at 13. A handle or wing nut 14 is threaded on to the end 13 and bears against the washer 15.

It will be readily seen that by screwing up the member 14, the tapered end 12 is drawn in between the dies 10, forcing the same outwardly, thus spreading the coupling member 4 and reforming the threads 5.

I claim as my invention:

A tool for expanding a coupling member comprising segmental dies with a radius of curvature approximately the same as that of the coupling member, a longitudinally bored cylindrical member with an annular flange at one end having radial slots extending therethrough, means carried in the slots for supporting the dies, a tapered member extending axially between the dies and through the bore in the cylindrical member, and means for forcing said tapered member further between the dies to force the latter outwardly into engagement with the coupling member.

In testimony that I claim the foregoing I have hereunto set my hand at Manitowoc, in the county of Manitowoc and State of Wisconsin.

HIRAM A. LARSON.